US012559661B2

(12) United States Patent
Wang et al.

(10) Patent No.: US 12,559,661 B2
(45) Date of Patent: Feb. 24, 2026

(54) COMPOSITE BODY HAVING HIGH THERMAL CONDUCTIVITY AND METHOD OF MAKING THE COMPOSITE BODY

(71) Applicant: SAINT-GOBAIN CERAMICS & PLASTICS, INC., Worcester, MA (US)

(72) Inventors: Hua Wang, Northbridge, MA (US); Shuai Liang, Southborough, MA (US); Nicholas Watkins, Bellingham, MA (US); Martin Z. Bazant, Wellesley, MA (US); Sarah Elizabeth Plain, Worcester, MA (US); Chuanping Li, Shrewsbury, MA (US); Mark Hampden-Smith, Chelmsford, MA (US); Mithun N. Kamath, Northborough, MA (US); Daniel Shrives, Harvard, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 365 days.

(21) Appl. No.: 18/046,883

(22) Filed: Oct. 14, 2022

(65) Prior Publication Data

US 2023/0123580 A1 Apr. 20, 2023

Related U.S. Application Data

(60) Provisional application No. 63/262,537, filed on Oct. 14, 2021.

(51) Int. Cl.
*C09K 5/14* (2006.01)
*B29B 7/90* (2006.01)
(Continued)

(52) U.S. Cl.
CPC .................. *C09K 5/14* (2013.01); *B29B 7/90* (2013.01); *B29C 48/0021* (2019.02);
(Continued)

(58) Field of Classification Search
CPC ........... C08K 3/38; C08K 2003/382–2003/385
See application file for complete search history.

(56) References Cited

U.S. PATENT DOCUMENTS 5,681,883 A    10/1997 Hill
7,189,778 B2    3/2007 Tobita
(Continued)

FOREIGN PATENT DOCUMENTS

CN        113416332 A      9/2021
EP           3616915 A1 *  3/2020   ........... B29C 64/106
(Continued)

OTHER PUBLICATIONS

E. Zolotoyabko "Determination of the degree of preferred orientation within the March-Dollase approach", J. Appl. Cryst (2009) 42 513-518.
(Continued)

*Primary Examiner* — Prashant J Khatri
(74) *Attorney, Agent, or Firm* — Abel Schillinger, LLP; Adrian Lawrence

(57) ABSTRACT

A composite article can comprise a composite body including an organic polymer and ceramic particles comprising hexagonal boron nitride (hBN) particles distributed throughout the organic polymer, wherein an amount of the hBN particles ranges from 40 vol % to 90 vol % based on a total volume of the body; and the body comprises an in plane thermal conductivity of at least 15 W/mK. The hBN particles within the composite body can have a March-Dollase Orientation parameter $\eta$ of at least 50%.

22 Claims, 3 Drawing Sheets

(51) Int. Cl.

| | |
|---|---|
| B29C 48/00 | (2019.01) |
| B29C 48/07 | (2019.01) |
| B29C 48/18 | (2019.01) |
| B29C 71/00 | (2006.01) |
| B29K 509/02 | (2006.01) |
| B29L 7/00 | (2006.01) |
| B32B 27/08 | (2006.01) |
| B32B 27/18 | (2006.01) |
| B32B 27/28 | (2006.01) |
| B32B 27/32 | (2006.01) |
| B32B 27/36 | (2006.01) |
| B32B 27/38 | (2006.01) |
| B32B 27/40 | (2006.01) |
| C08J 5/02 | (2006.01) |
| C08J 5/18 | (2006.01) |
| C08K 3/38 | (2006.01) |
| C08K 9/06 | (2006.01) |
| C08L 83/04 | (2006.01) |
| B29K 83/00 | (2006.01) |
| B29K 307/02 | (2006.01) |

(52) U.S. Cl.
CPC .......... *B29C 48/0022* (2019.02); *B29C 48/07* (2019.02); *B29C 48/185* (2019.02); *B29C 71/0072* (2013.01); *B32B 27/08* (2013.01); *B32B 27/18* (2013.01); *B32B 27/283* (2013.01); *B32B 27/32* (2013.01); *B32B 27/36* (2013.01); *B32B 27/38* (2013.01); *B32B 27/40* (2013.01); *C08J 5/02* (2013.01); *C08J 5/18* (2013.01); *C08K 3/38* (2013.01); *C08K 9/06* (2013.01); *C08L 83/04* (2013.01); *B29K 2083/00* (2013.01); *B29K 2307/02* (2013.01); *B29K 2509/02* (2013.01); *B29K 2995/0007* (2013.01); *B29K 2995/0013* (2013.01); *B29K 2995/0094* (2013.01); *B29K 2995/0097* (2013.01); *B29L 2007/002* (2013.01); *B32B 2250/05* (2013.01); *B32B 2250/24* (2013.01); *B32B 2264/104* (2013.01); *B32B 2264/303* (2020.08); *B32B 2274/00* (2013.01); *B32B 2307/20* (2013.01); *B32B 2307/302* (2013.01); *B32B 2307/7376* (2023.05); *C08J 2383/04* (2013.01); *C08K 2003/385* (2013.01); *C08K 2201/001* (2013.01); *C08K 2201/005* (2013.01); *C08K 2201/016* (2013.01)

(56) References Cited

U.S. PATENT DOCUMENTS

| | | | |
|---|---|---|---|
| 7,445,797 | B2 | 11/2008 | Meneghetti |
| 8,404,768 | B2 | 3/2013 | Ramasamy |
| 8,921,507 | B2 | 12/2014 | Yoshihara |
| 8,946,333 | B2 | 2/2015 | Raman |
| 8,946,335 | B2 | 2/2015 | Yoshihara |
| 9,023,462 | B2 | 5/2015 | Lee |
| 9,227,354 | B2 | 1/2016 | Chang |
| 9,573,312 | B2 | 2/2017 | Cruz |
| 9,656,868 | B2 | 5/2017 | Nishi |
| 10,328,620 | B2 | 6/2019 | Uibel |
| 10,414,653 | B2 | 9/2019 | Ikemiya |
| 10,851,277 | B2 | 12/2020 | Takagi |
| 2007/0001292 | A1 | 1/2007 | Ohta |
| 2007/0045823 | A1 | 3/2007 | Miller |
| 2011/0155948 | A1 | 6/2011 | Namkung |
| 2011/0192588 | A1 | 8/2011 | Suzuki |
| 2011/0259569 | A1 | 10/2011 | Izumitani |
| 2013/0143981 | A1* | 6/2013 | Miyata ..................... C08K 3/38 |
| | | | 523/440 |
| 2014/0077125 | A1 | 3/2014 | Lin |
| 2016/0145411 | A1 | 5/2016 | Uibel |
| 2016/0325993 | A1 | 11/2016 | Søgaard |
| 2016/0325994 | A1* | 11/2016 | Qu ....................... C10M 125/26 |
| 2019/0176448 | A1 | 6/2019 | Mukohata |
| 2019/0176488 | A1 | 6/2019 | Nakano |
| 2019/0337803 | A1* | 11/2019 | Otsuka ................. C01B 32/991 |
| 2020/0056094 | A1 | 2/2020 | Lim et al. |
| 2021/0070952 | A1 | 3/2021 | Suzumura |
| 2022/0128748 | A1 | 4/2022 | Jones |
| 2023/0018988 | A1 | 1/2023 | Kim |

FOREIGN PATENT DOCUMENTS

| | | | |
|---|---|---|---|
| JP | 2016135732 | A | 7/2016 |
| JP | 2018159062 | A | 10/2018 |
| JP | 2020045456 | A | 3/2020 |
| JP | 2020164365 | A | 10/2020 |
| KR | 1020160125711 | A | 11/2016 |
| KR | 102123231 | B1 | 6/2020 |
| WO | 2014080743 | A1 | 1/2017 |
| WO | 2020100482 | A1 | 2/2021 |

OTHER PUBLICATIONS

W. A. Dollase "Correction of Intensities for Preferred Orientation in Powder Diffractometry: Application of the March Model", J. Appl. Cryst. (1986). 19, 267-272.

International Search Report dated Feb. 1, 2023 with regard to International Application No. PCT/US2022/078170.

Bashkirov et al.; "Influence of annealing on microstructure and optical properties of hot wall deposited PbxSn(1-x)S thin films", Thin Solid Films 616 (2016) 773-779.

Lee,"Scalable Exfoliation Process for Highly Soluble Boron Nitride Nanoplatelets by Hydroxide-Assisted Ball Milling".

6 Hot Disk Thermal Constants Analyser Instruction Manual, Revision date Apr. 15, 2015.

\* cited by examiner

COMPOSITE BODY HAVING HIGH THERMAL CONDUCTIVITY AND METHOD OF MAKING THE COMPOSITE BODY

CROSS-REFERENCE TO RELATED APPLICATION(S)

This application claims priority under 35 U.S.C. § 119(e) to U.S. Patent application No. 63/262,537, entitled "COMPOSITE BODY HAVING HIGH THERMAL CONDUCTIVITY AND METHOD OF MAKING THE COMPOSITE BODY," by Hua WANG et al., filed Oct. 14, 2021, which is assigned to the current assignee hereof and incorporated herein by reference in its entirety.

FIELD OF THE DISCLOSURE

The present disclosure relates to a composite body including an organic polymer and ceramic particles comprising hexagonal boron nitride (hBN) particles distributed throughout the organic polymer with a high degree of orientation, and methods of making the composite body.

BACKGROUND

Thermally conductive polymer composites play an essential role in a variety of industries with regard to thermal management of electrical devices, as they can significantly lower the operating temperature and prolong the life of a device by dissipating heat to avoid overheating. Typical industries wherein thermally conductive polymer composites play a critical role include consumer electronics (e.g., cell phones, tablets), telecommunication infrastructure (e.g., cell towers), LED lighting, hybrid, and electric vehicles (power modules), data centers (server boards, switches, supervisor modules, and power supplies), and solar cells.

There exists a need to further enhance the variety and efficiency of materials suitable for thermal management.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a composite article comprising a composite body including an organic polymer and ceramic particles comprising hexagonal boron nitride (hBN) particles distributed throughout the organic polymer, wherein the amount of the hBN particles can be 40 vol % to 90 vol % based on the total volume of the composite body, at least 90 vol % of the ceramic particles may be hBN particles, and the in-plane thermal conductivity of the composite body can be at least 13.5 W/mK.

In one embodiment, the in-plane thermal conductivity of the composite body can be at least 14.0 W/mK, or at least 14.5 W/mK, or at least 15.0 W/mK, or at least 15.5 W/mK, or at least 16.0 W/mK, or at least 16.5 W/mK, or at least 17.0 W/mK, or at least 17.5 W/mK, or at least 18.0 W/mK, or at least 18.5 W/mK, or at least 19.0 W/mK, or at least 19.5 W/mK, or at least 20 W/mK. In another aspect, the in-plane thermal conductivity may be not greater than 40 W/mK, or not greater than 35 W/mK, or not greater than 30 W/mK, or not greater than 25 W/mK.

Figure 1A:
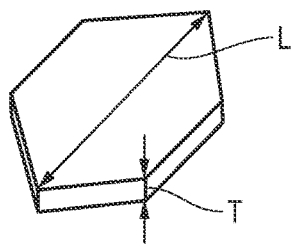
FIG. 1A includes a line drawing illustrating a platelet type hBN particle according to one embodiment.

As used herein, the term hBN particles, if not indicated otherwise, relates to platelet shaped hBN particles having an average aspect ratio of length to thickness (L/T) of at least 5 as illustrated in FIG. 1A. The hBN particles contained in the composite body can be unmodified or surface modified. If not specifically described herein, the term hBN particles relates to both unmodified or surface modified hBN particles.

Figure 1B:
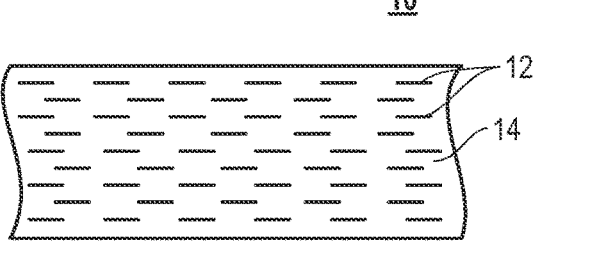
FIG. 1B includes a line drawing illustrating a side view of a cross-cut of a composite body having in-plane oriented hBN particles according to one embodiment.
Figure 1C:
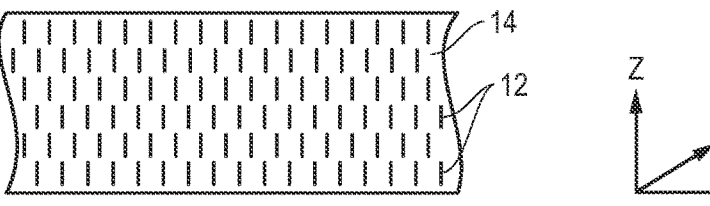
FIG. 1C includes a line drawing illustrating a side view of a cross-cut of a composite slice having through-plane oriented hBN particles according to one embodiment.

As further used herein, the term "in-plane" relates to the x-y direction of the composite body. FIG. 1B illustrates the cross-cut (10) of a composite body wherein the hBN particles (12) are distributed throughout the organic polymer (14) and the hBN particles (12) can be oriented or aligned in the x-y direction of the body, which is interchangeable called herein "in-plane." In contrast, FIG. 1C illustrates an embodiment of a composite slice wherein the hBN particles (12) are aligned in z-direction, also called interchangeable herein "through-plane" or thickness direction of the body.

In one embodiment, the composite body of the present disclosure can be made by preparing a mixture comprising ceramic particles including hBN and an organic polymer; applying a layer of the mixture to a mold or a support; conducting an alignment procedure of the hBN particles; and solidifying and/or curing the organic polymer to form the composite body. The mixture of hBN and organic polymer can be a liquid mixture or a powder mixture.

In one aspect, the alignment procedure can comprises applying a pressure orthogonal to the in-plane direction (x-y direction) of the layer of the mixture.

In one embodiment, the hBN particles can have an average aspect ratio of length (L) to thickness (T) of the hBN particles of at least 5, or at least 7, or at least 10, or at least 20, or at least 30, or at least 40, or at least 50, or at least 60, or at least 70, or at least 80, or at least 90, or at least 100, or at least 110, or at least 120. In another aspect, the aspect ratio may be not greater than 200, or not greater than 120, or not greater than 80, or not greater than 50, or not greater than 30, or not greater than 15.

In another embodiment, the hBN particles can have an average particle size (D50) of at least 1 micron, or at least 3 microns, or at least 5 microns, or at least 10 microns, or at least 15 microns, or at least 20 microns, or at least 25 microns, or at least 30 microns. In a further aspect, the hBN particles may have an average particle size of not greater than 100 microns, or not greater than 50 microns, or not greater than 45 microns, or not greater than 40 microns, or greater than 35 microns, or not greater than 30 microns, or not greater than 25 microns, or not greater than 20 microns, or not great than 10 microns, or not great than 5 microns.

In a certain embodiment, the hBN particles of the composite body can have a multi-modal particle distribution, for example, a bi-modal or three-modal distribution. In a particular aspect, the particles distribution can be a bi-modal particle distribution (PSD).

In one aspect, the particle size distribution of the hBN particles can include a first peak having a first peak maximum and a second peak having a second peak maximum, and an intensity ratio of the first peak maximum to the second peak maximum can be at least 1.5:1, or at least 2:1 or at least 2.5:1, or at least 3.0:1. In another aspect, the intensity ratio of the first peak maximum to the second peak maximum may be not greater than 10:1, or not greater than 7:1 or not greater than 5:1, or not greater than 4:1, or not greater than 3.5:1, or not greater than 3.0:1.

In another aspect, the distance between the first peak maximum and the second peak maximum of the hBN particle size distribution can be at least 20 microns, or at least 25 microns, or at least 30 microns, or at least 35 microns. In a further aspect, the distance between the first peak maximum and the second peak maximum may be not greater than 70 microns, or not greater than 60 microns, or not greater than 50 microns, or not greater than 40 microns, or not greater than 35 microns.

In yet a further aspect, the first peak maximum can correspond to a hBN particles size in a range of 8 microns to 13 microns, and the second peak maximum may corresponds to a hBN particle size in a range of 35 to 50 microns.

In another aspect the difference between the average particle size (D50) and the mean particle size of the hBN particles can be at least 2 microns, or at least 3 microns, or at least 4 microns, or at least 5 microns, or at least 6 microns, or at least 7 microns, or at least 8 microns, or at least 9 microns, or at least 10 microns. In a further aspect, difference between the average particle size (D50) and the mean particle size of the hBN particles may be not greater than 20 microns, or not greater than 15 microns, or not greater than 14 microns, or not greater than 13 microns, or not greater than 12 microns, or not greater than 11 microns, or not greater than 10 microns.

In a particular aspect, the average particle size (D50) of the hBN particles can range from 9 microns to 13 microns and a mean particle size may ranges from 15 microns to 25 microns.

In another aspect, the eighty percent distribution value (D90-D10) of the hBN particle distribution can be at least 15 microns, or at least 20 microns, or at least 25 microns, or at least 30 microns, or at least 35 microns, or at least 40 microns, or at least 45 microns, or at least 50 microns. In another aspect, the eighty percent distribution value (D90-D10) of the hBN particle distribution may be not greater than 80 microns, or not greater than 70 microns, or not greater than 60 microns, or not greater than 50 microns, or not greater than 45 microns, or not greater than 40 microns.

The organic polymer can be a thermoplastic or thermoset polymer.

In a particular aspect, the organic polymer can be a polymerizable polymer including functional groups. In a certain particular aspect, curing of the polymerizable monomer may be required after and/or during compression molding.

Non-limiting examples of the polymerizable polymer can include a silicone polymer, or an acrylate polymer, or an epoxy polymer.

In a certain particular aspect, the polymerizable polymer can be a silicone polymer comprising vinyl groups. In a non-limiting embodiment, the silicone polymer comprising vinyl groups can be polymerized by cross-linking with a cross-linking agent. In one aspect, the weight percent ratio of silicone polymer comprising vinyl groups to cross-linking agent can be between 0.5 to 5, or 1 to 3, or 1 to 2.

In certain aspects, the silicone polymer can have a molecular weight of at least 10,000 g/mol, at least 100,000 g/mol, at least 200,000 g/mol, at least 400,000 g/mol, or at least 700,000 g/mol. In other certain aspects, the molecular weight of the silicone polymer may be not greater than 1,000,000 g/mol, or not greater than 800,000 g/mol, or not greater than 700,000 g/mol, or not greater than 500,000 g/mol, or not greater than 300,000 g/mol, or not greater than 100,000 g/mol.

In another particular aspect, the organic polymer can be a thermoplastic polymer. Non-limiting examples of thermoplastic polymers can include a polyethylene, a polypropylene, a polystyrene, a polyurethane, a polyacrylate, a polyester, a polycarbonate, a polyimide, a polybutylene terephthalate (PBT), polymethyl methacrylate (PMMA), a polyethylene terephthalate (PET), a polyamide, a liquid crystalline polymer (LCP), a polyacrylonitrile (PAN), a polyether ether ketone (PEEK), a polyetherketoneketone (PEKK), a polysulfone, a polyethersulfone, a polyphenylene oxide (PPO), a polyetherimide, a thermoplastic elastomer (TPE, olefinic or styrenic), a fluoropolymer such as polyvinylidene fluoride (PVDF), a perfluoroalkoxy alkanes (PFA), a fluorinated ethylene propylene (FEP), or an ethylene tetrafluoroethylene (ETFE), or any copolymer thereof, or any combination thereof.

In one embodiment, the hBN particles can be surface functionalized before combining them with the organic polymer. For example, the surface functionalizing of the hBN particles can include oxygen plasma treatment, or silane surface functionalizing, or fluorine surface functionalizing, or epoxy surface functionalizing, or amine surface functionalizing, or hydroxyl surface functionalizing. The surface functionalization of the hBN particles can be of advantage to obtain a higher solids loading of hBN particles within the organic polymer. In a particular aspect, before surface functionalization, the hBN particles can be subjected to exfoliation and/or an activation by treatment with OH-introducing compounds.

In a certain particular aspect, the organic polymer can be a silicone, and the hBN particles can be surface functionalized with a silane, or via oxygen plasma treatment, or via fluorine surface functionalization. Non-limiting examples of silane compounds can include $SiH_4$, or an aminosilane.

Examples of fluorine surface functionalization can include plasma treatment with CF4, or CHF3, $SF_6$, or $C_2F_6$.

In another aspect, the organic polymer can be an epoxy polymer, and the hBN particles may be surface functionalized with an epoxy compound, or an amine, or hydroxyl-groups. Non-limiting examples of introducing epoxy-compounds can be plasma treatment with glycidyl methacrylate or plasma treatment with allyl glycidyl ether. Examples of amine functionalization can include plasma treatment with allylamine or 3-(aminopropyl) triethoxysilane.

In a further aspect, the organic polymer can be a polyethylene, and the hBN particles can be subjected to fluorine surface functionalization, or silane functionalization.

In yet another aspect, the organic polymer can be a thermoplastic polyurethane (TPU) or polybutylene terephthalate (PBT), and the hBN particles can be functionalized with an epoxy compound, an amine, or hydroxyl groups. In certain further aspects, PBT can be also surface functionalized by oxygen plasma treatment, air-plasma treatment, treatment with boric acid/urea combined with thermal treatment, or boric acid/melamine combined with thermal treatment.

In a particular embodiment, the majority of the ceramic particles contained within the composite body can be hBN particles, such as at least 90 vol % based on the total volume of ceramic particles, or at least 92 vol %, or at least 94 vol %, or at least 96 vol %, or at least 98 vol %, or at least 99 vol %. In a certain particular embodiment, the ceramic particles can consist essentially of hBN particles, wherein consisting essentially of hBN particle means herein having not more than 0.5 vol % ceramic particles which are not hBN particles.

The orientation of the hBN particles within the body (herein also called interchangeable alignment of the hBN particles) can be measured by conducting X-ray diffractometry and analyzing the X-ray spectrum according to the March-Dollase method (see detailed description in the examples). It was found that the March-Dollase orientation parameter η can be a suitable quantitative expression for characterizing the degree of alignment of the dispersed hBN particles within the composite body. A good alignment is considered in the present disclosure a March-Dollase orientation parameter η of at least 50%. In certain aspects, the March-Dollase orientation parameter of the hBN particles in the composite body can be at least 52%, or at least 54%, or at least 56%, or at least 58%, or at least 60%.

As further demonstrated in the examples, it has been surprisingly found that a certain size variation of the hBN particles contained in the composite body may contribute to a large increase in the thermal conductivity of the composite body.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A composite article comprising: a composite body including an organic polymer and ceramic particles comprising hexagonal boron nitride (hBN) particles distributed throughout the organic polymer, wherein an amount of the hBN particles ranges from 40 vol % to 90 vol % based on a total volume of the composite body;

at least 90 vol % of the ceramic particles are hBN particles; and the composite body comprises an in plane thermal conductivity of at least 13.5 W/mK.

Embodiment 2. The composite article of Embodiment 1, wherein an in-plane March-Dollase orientation parameter η of the hBN particles within the composite body is at least 50%.

Embodiment 3. The composite article of Embodiments 1 or 2, wherein the March-Dollase orientation parameter η is at least 52, or at least 54, or at least 56, or at least 58, or at least 60.

Embodiment 4. The composite article of any one of Embodiments 1-3, wherein the in-plane thermal conductivity of the composite body is at least 14.0 W/mK, or at least 14.5 W/mK, or at least 15.0 W/mK, or at least 15.5 W/mK, or at least 16.0 W/mK, or at least 16.5 W/mK, or at least 17.0 W/mK, or at least 17.5 W/mK, or at least 18.0 W/mK, or at least 18.5 W/mK, or at least 19.0 W/mK, or at least 19.5 W/mK, or at least 20 W/mK.

Embodiment 5. The composite article of any of Embodiments 1-4, wherein the in-plane thermal conductivity of the composite body is not greater than 40 W/mK, or not greater than 35 W/mK, or not greater than 30 W/mK, or not greater than 25 W/mK.

Embodiment 6. The composite article of any one of the preceding Embodiments, wherein an average aspect ratio of length to thickness of the hBN particles is at least 5, or at least 10, or at least 20, or at least 30, or at least 40, or at least 50, or at least 60, or at least 70, or at least 80, or at least 90, or at least 100, or at least 110, or at least 120.

Embodiment 7. The composite article of any one of the preceding Embodiments, wherein the average aspect ratio of the hBN particles is not greater than 200, or not greater than 120, or not greater than 80, or not greater than 50, or not greater than 30, or not greater than 15.

Embodiment 8. The composite article of any one of the preceding Embodiments, wherein the hBN particles have an average particle size (D50) of at least 1 micron, or at least 3 microns, or at least 5 microns, or at least 10 microns, or at least 15 microns, or at least 20 microns, or at least 25 microns, or at least 30 microns.

Embodiment 9. The composite article of any one of the preceding Embodiments, wherein the hBN particles have an average particle size of not greater than 100 microns, or not greater than 50 microns, or not greater than 45 microns, or not greater than 40 microns, or greater than 35 microns, or not greater than 30 microns, or not greater than 25 microns, or not greater than 20 microns, or not great than 10 microns, or not great than 5 microns.

Embodiment 10. The composite article of any one of the preceding Embodiments, wherein the hBN particles comprise a multi-modal particle distribution.

Embodiment 11. The composite article of Embodiment 10, wherein the hBN particles comprise a bi-modal particle distribution.

Embodiment 12. The composite article of any one of Embodiments 10-11, wherein a particle size distribution of the hBN particles includes a first peak having a first peak maximum and a second peak having a second peak maximum, and an intensity ratio of the first peak maximum to the second peak maximum is at least 1.5:1, or at least 2:1 or at least 2.5:1, or at least 3.0:1.

Embodiment 13. The composite article of any one of Embodiments 10-12, wherein a particle size distribution of the hBN particles includes a first peak having a first peak maximum and a second peak having a second peak maximum, and an intensity ratio of the first peak maximum to the second peak maximum is not greater than 10:1, or not greater than 7:1 or not greater than 5:1, or not greater than 4:1, or not greater than 3.5:1, or not greater than 3.0:1.

Embodiment 14. The composite article of Embodiments 12 or 13, wherein a distance between the first peak maximum and the second peak maximum is at least 20 microns, or at least 25 microns, or at least 30 microns, or at least 35 microns.

Embodiment 15. The composite article of Embodiments 12 or 14, wherein a distance between the first peak maximum and the second peak maximum is not greater than 70 microns, or not greater than 60 microns, or not greater than 60 microns, or not greater than 50 microns, or not greater than 40 microns, or not greater than 35 microns.

Embodiment 16. The composite article of any one of Embodiments 12-15, wherein the first peak maximum corresponds to a particles size in a range of 8 microns to 13 microns, and the second peak maximum corresponds to a particle size in a range of 35 to 50 microns.

Embodiment 17. The composite article of any one of Embodiments 10-16, wherein a difference between the average particle size (D50) and the mean particle size of the hBN particles is at least 2 microns, or at least 3 microns, or at least 4 microns, or at least 5 microns, or at least 6 microns, or at least 7 microns, or at least 8 microns, or at least 9 microns, or at least 10 microns.

Embodiment 18. The composite article of any one of Embodiments 10-17, wherein a difference between the average particle size (D50) and the mean particle size of the hBN particles is not greater than 20 microns, or not greater than 15 microns, or not greater than 14 microns, or not greater than 13 microns, or not greater than 12 microns, or not greater than 11 microns, or not greater than 10 microns.

Embodiment 19. The composite article of any one of Embodiments 10-18, wherein an eighty percent distribution value (D90-D10) of the hBN particles is at least 15 microns, or at least 20 microns, or at least 25 microns, or at least 30 microns, or at least 35 microns, or at least 40 microns, or at least 45 microns, or at least 50 microns.

Embodiment 20. The composite article of any one of Embodiments 10-19, wherein an eighty percent distribution value (D90-D10) of the hBN particles is not greater than 80 microns, or not greater than 70 microns, or not greater than 60 microns, or not greater than 50 microns, or not greater than 45 microns, or not greater than 40 microns.

Embodiment 21. The composite article of any one of Embodiments 10-20, wherein a D90 value of the particle size of the hBN particles is at least 30 microns, or at least 35 microns, or at least 40 microns, or at least 45 microns, or at least 50 microns, or at least 55 microns, or at least 60 microns.

Embodiment 22. The composite article of any one of Embodiments 10-20, wherein a D90 value of the particle size of the hBN particles is not greater than 120 microns, or not greater than 110 microns, or not greater than 90 microns, or not greater than 80 microns, or not greater than 70 microns, or not greater than 60 microns, or not greater than 55 microns.

Embodiment 23. The composite article of any one of Embodiments 10-22, wherein a D50 value of the particle size of the hBN particles is at least 6 microns, or at least 7 microns, or at least 8 microns, or at least 9 microns, or at least 10 microns, of at least 11 microns, or at least 12 microns, or at least 13 microns, or at least 15 microns, or at least 20 microns.

Embodiment 24. The composite article of any one of Embodiments 10-22, wherein a D50 value of the particles size of the hBN particles is not greater than 40 microns, or not greater than 35 microns, or not greater than 30 microns, or not greater than 25 microns, or not greater than 20 microns, or not greater than 15 microns.

Embodiment 25. The composite article of any one of Embodiments 10-24, wherein a D10 value of the particle size of the hBN particles is at least 1 micron, or at least 2 microns, or at least 30 microns, or at least 4 microns, or at least 5 microns, or at least 6 microns.

Embodiment 26. The composite article of any one of Embodiments 10-24, wherein a D10 value of the particle size of the hBN particles is not greater than 12 microns, or not greater than 10 microns, or not greater than 8 microns, or not greater than 6 microns, or not greater than 4 microns, or not greater than 2 microns.

Embodiment 27. The composition of any one of Embodiments 10-26, wherein an average particle size (D50) of the hBN particles ranges from 9 microns to 13 microns and a mean particle size ranges from 15 microns to 25 microns.

Embodiment 28. The composite article of any one of the preceding Embodiments, wherein an electric volume resistivity of the composite body is at least 1.0E+12; or at least 1.0E+13, or at least 1.0E+14.

Embodiment 29. The composite article of any one of the preceding Embodiments, wherein the organic polymer of the composite body includes a thermoplastic polymer or a thermoset polymer.

Embodiment 30. The composite article of Embodiment 29, wherein the organic polymer includes a silicone polymer, an acrylate polymer, a polyurethane, an epoxide polymer, a polyamide, a polyimide, a liquid crystalline polymer (LCP), a fluoropolymer, a polyethylene, a polypropylene, a polystyrene, a polyester, a polycarbonate, a polybutylene terephthalate (PBT), a polyethylene terephthalate (PET), a polyamide, a liquid crystalline polymer (LCP), a polyacrylonitrile (PAN), a polyether ether ketone (PEEK), a polyetherketoneketone (PEKK), a polysulfone, a polyethersulfone, a polyphenylene oxide (PPO), a polyetherimide, a thermoplastic elastomer (TPE, olefinic or styrenic), a polyvinylidene fluoride (PVDF), a perfluoroalkoxy alkane (PFA), a fluorinated ethylene propylene (FEP), an ethylene tetrafluoroethylene (ETFE), or any copolymer thereof, or any combination thereof.

Embodiment 31. The composite article of any one of the preceding Embodiments, wherein the organic polymer includes a silicone polymer.

Embodiment 32. The composite article of Embodiment 24, wherein the organic polymer consists essentially of the silicone polymer.

Embodiment 33. The composite article of any one of Embodiments 24 or 25, wherein the silicone polymer has a molecular weight of at least 10,000 g/mol, at least 100,000 g/mol, at least 200,000 g/mol, at least 400,000 g/mol, or at least 700,000 g/mol.

Embodiment 34. The composite article of any one of Embodiments 24-26, wherein the silicone polymer has a molecular weight not greater than 1,000,000 g/mol, or not greater than 800,000 g/mol, or not greater than 700,000 g/mol, or not greater than 500,000 g/mol, or not greater than 300,000 g/mol, or not greater than 100,000 g/mol.

Embodiment 35. The composite article of any one of the preceding Embodiments, wherein the composite body further comprises a surfactant.

Embodiment 36. The composite article of Embodiment 35, wherein an amount of the surfactant is at least 0.1 w %

9 based on the total weight of the composite body, or at least 0.5 wt %, or at least 1 wt %, or at least 2 wt %, or at least 3 wt %, or at least 4 wt %.

Embodiment 37. The composite article of Embodiment 35, wherein an amount of the surfactant is not greater than 7 w % based on the total weight of the body, or not greater than 5 wt %, or not greater than 3 wt %, or not greater than 2 wt %.

Embodiment 38. The composite article of any one of Embodiments 35 to 37, wherein the surfactant is a polysiloxane.

Embodiment 39. The composite article of any of the preceding Embodiments, wherein the ceramic particles of the composite body comprise at least 92 vol % hBN particles based on the total volume of ceramic particles, or as at least 94 vol %, at least 96 vol %, or least 98 vol %, or at least 99 vol %.

Embodiment 40. The composite article of any one of the preceding Embodiments, wherein the ceramic particles of the composite boy consist essentially of hBN particles.

Embodiment 41. The composite article of any one of the preceding Embodiments, wherein a surface of the hBN particles includes a functionalization compound.

Embodiment 42. The composite article of Embodiment 41, wherein the functionalization compound includes a silane compound, or an epoxy compound, or an amine compound, or a fluorine compound, or hydroxyl groups.

Embodiment 43. The composite article of any one of the preceding Embodiments, wherein the composite body is a sheet having a thickness of at least 25 microns, or at least 50 microns, or at least 100 microns, or at least 300 microns, or at least 500, microns, or at least 1000 microns, or at least 5000 microns.

Embodiment 44. The composite article of any one of the preceding Embodiments, wherein the composite boy is a sheet having a thickness of not greater than 10000 microns, or not greater than 5000 microns, or not greater than 1000 microns.

Embodiment 45. A method of forming a composite article, comprising:
  preparing a mixture of ceramic particles and an organic polymer, wherein the ceramic particles comprise at least 90 vol % hBN particles based on the total volume of the ceramic particles, and an amount of the hBN particles ranges from 40 vol % to 90 vol % based on a total volume of the mixture;
  applying a layer of the mixture to a mold or a support;
  conducting an alignment procedure of the hBN particles; and
  solidifying and/or curing the organic polymer to form a composite body,
  wherein an in-plane thermal conductivity of the composite body is at least 13.5 W/mK.

Embodiment 46. The method of Embodiment 43, wherein the alignment procedure comprises applying a pressure on the layer of the mixture.

Embodiment 47. The method of Embodiment 44, wherein the pressure is adjusted that a degree of an in-plane March-Dollase orientation parameter of the body after solidifying and/or curing is at least 50%.

Embodiment 48. The method of Embodiments 44 or 45, wherein the pressure is at least 2 MPa, or at least 100 MPa, or at least 500 MPa.

Embodiment 49. The method of any one of Embodiments 43-46, wherein the organic polymer is a polymerizable polymer including functional groups.

Embodiment 50. The method of Embodiment 47, wherein the polymerizable polymer includes a silicone polymer, or an acrylate polymer, or an epoxy-polymer.

Embodiment 51. The method of Embodiment 48, wherein the polymerizable polymer is a silicone polymer comprising vinyl groups.

Embodiment 52. The method of any one of Embodiments 43-49, wherein the mixture is a liquid dispersion.

Embodiment 53. The method Embodiment 43, wherein the mixture is a dry powder mixture.

Embodiment 54. The method of any one of Embodiments 43-51, further comprising surface functionalizing the hBN particles before preparing the mixture.

Embodiment 55. The method of Embodiment 52, wherein surface functionalizing of the hBN particles includes an oxygen plasma treatment, or silane surface functionalizing, or fluorine surface functionalizing, or epoxy surface functionalizing, or amine surface functionalizing, or hydroxyl surface functionalizing.

Embodiment 56. The method of Embodiment 53, wherein surface functionalizing includes silane surface functionalizing and the organic polymer includes a silicone polymer.

EXAMPLES

The following non-limiting examples illustrate the present invention.

Example 1

Preparing of hBN-Silicone Composite Bodies

Liquid mixtures were prepared by combining hBN particles with a silicone-gum (AB specialty Andigum H110-0) and 2,4-dichlorobenzoyl peroxide (50% in polydimethylsiloxane; Gelest) as crosslinking agent. The weight percent ratio of the crosslinker to silicone was about 1-1.5. The mixtures further contained 2 wt % Siltech silicone surfactant and 3 wt % Evonik VS10000. The mixing of the dispersions was conducted in a Brabender mixture for about 40 minutes at room temperature. In all experiments of example 1, the amount of hBN was 64 vol % based on the total volume of the liquid mixture.

In the series of the conducted experiments, the hBN particles were varied by using combinations of hBN powders having different average (D50) particle sizes. The following hBN powders were used: hBN-1, having a D50 size of 5.5 microns, hBN-2, having a D50 size of 16 microns, and hBN-3 with a D50 size of 30 microns, as also summarized in Table 1.

TABLE 1

|       | D50 size | Aspect ratio |
| --- | --- | --- |
| hBN-1 | 5.5 | 8 |
| hBN-2 | 16 | 8-10 |
| hBN-3 | 30 | 7-8 |

After preparing the hBN-containing polymer mixtures, composite bodies were made by sandwiching the compound between two metal plates and then pressing to a pre-determined thickness of about 0.35 mm at a pressure of 2-110 MPa for 20 minutes. Specifically, the pressing was conducted between two 12"×12" metal plates with an applied weight of 60,000 lbs. The pre-determined thickness was made by pressing the mixture between two metal plates containing a shim as spacer with the desired sheet thickness.

After cold pressing, the pressed sheet (sheet) was cured in an oven at 120° C. for 4 minutes for curing the silicone polymer.

It can be seen from the data summarized in Table 2, that with a total hBN amount of 68 vol % and the powder combination of hBN1, hBN2, and hBN3, a high thermal conductivity of 18.3 W/mK was achieved. In contrast, using a combination of hBN1 and hBN2 (comparative sample C1), or only the powder hBN1 (comparative sample C2), the measured thermal conductivity was much lower. Not being bound to theory, the surprising advantage of the hBN powder combination of sample E1 may be related to an optimized alignment and improved packing density of the hBN particles within the formed composite body.

Figure 3A:
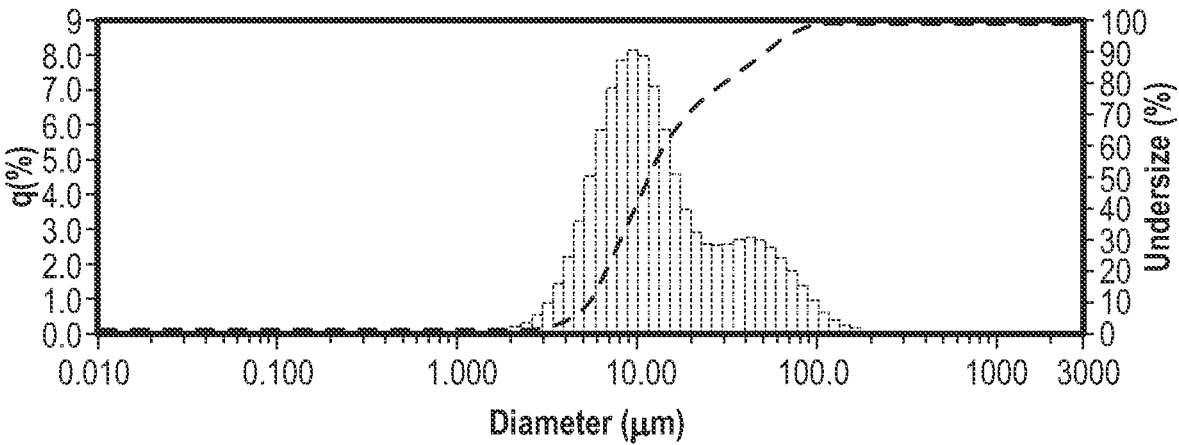
FIG. 3A includes a graph showing the particle distribution of hBN particles contained in a composite body according to one embodiment.

A graph of the particle size distribution (PSD) measurement for the 1:1:1 mixture of hBN1/hBN2/hBN3 is shown in FIG. 3A. It can be seen that the PSD is a bi-modal distribution. The first peak maximum is at 10.1 microns, which is very close to the D50 particles size of 11.5 microns, while the second peak is much further away located, at 44.9 microns. The intensity ratio between the first peak and the second peak is 2.98 to 1.0.

Figure 3B:
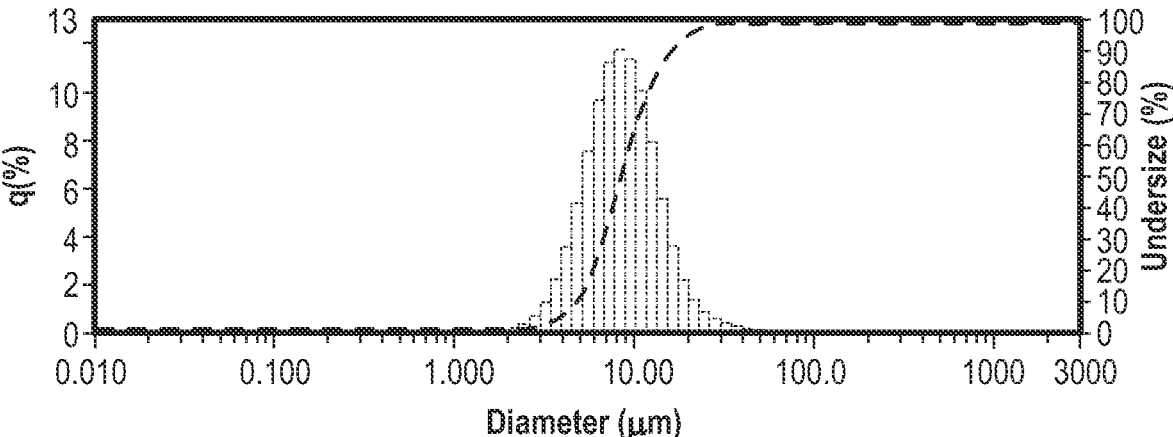
FIG. 3B includes a graph showing the particle distribution of hBN particles contained in a comparative composite body.

In contrast, the PSD of comparative sample C1 (see FIG. 3B) shows a mono-modal distribution, wherein the D50 value and the Dmean value are very close together (1.3 microns).

TABLE 2

| Sample | hBN | Weight % ratio | Thermal Conductivity [W/mK] | D50 | Dmean | D10 | D90 |
|---|---|---|---|---|---|---|---|
| E1 | hBN-1/ hBN-2/ hBN-3 | 1:1:1 | 18.2 | 11.5 | 20.8 | 5.3 | 51.8 |
| C1 | hBN-1/ hBN-2 | 1:1 | 12.8 | 8.4 | 9.6 | 4.6 | 15.4 |
| C2 | hBN-3 | | 12.7 | 5.5 | | 3.3 | 10.0 |

Example 2

Experiments are conducted as described in Example 1 for sample E1, except that the total amount of hBN is varied in the liquid mixture. The total hBN amounts are 45 vol % (sample E2), 55 vol % (sample E3) and 70 vol % (sample E5). The thermal conductivity is being measured and expected to be greater than 15 W/mK.

Example 3

Experiments are conducted as described in Example 1 for sample E1, except that the organic polymer is changed to TPU (sample E5) and BMP (sample E6). The thermal conductivity is being measured and expected to be greater than 15 W/mK.

Example 4

A plurality of composite sheets as obtained in Example 1 for sample E1 are added to a multi-layer stack of sheets before curing. The stack is subjected to a compression treatment by applying a pressure, and followed by a heat treatment to conduct curing of the silicone polymer.

From the pressed and cured multi-layer stack, a 0.5 mm thick composite slice is cut with a diamond wire. The composite slice is analyzed in its thickness direction (z) for the thermal conductivity. The thermal conductivity throughout the thickness direction (z-direction, also called through-plane) of the composite slice is being measured, and expected to be at least 90% of the in-plane thermal conductivity of the multi-layer composite body of sample E1. An illustration of a composite slice with the through-plane oriented hBN particles (14) is shown in FIG. 1C.

Measuring the Thermal Conductivity

The thermal conductivity was measured using a transient plane source device (TPS 2500 S, Hot Disk Instruments). The instrument and measurement are designed by placing a temperature sensor between two samples of the test material, introducing a pulse of heat at the surface of the test sample, measuring the temperature change, and calculating based thereon the thermal conductivity. The temperature sensor was a Paton-insulated Hot Disk® sensor model 5501 (6.4 mm radius). The heat pulse was varied in the range of 60-150 mW for 3-15 seconds to make sure that the conductivity values stay constant independent of the pulse parameters. The measurements were conducted according to the Hot Disk Thermal Constants Analyser Instruction Manual (Apr. 15, 2015) from Hot Disk®. For the measurements of the in-plane thermal conductivity was used the slab module, while for measuring the through-plane thermal conductivity was applied the anisotropic method.

Measuring the March-Dollase Orientation Parameter η

Figure 2A:
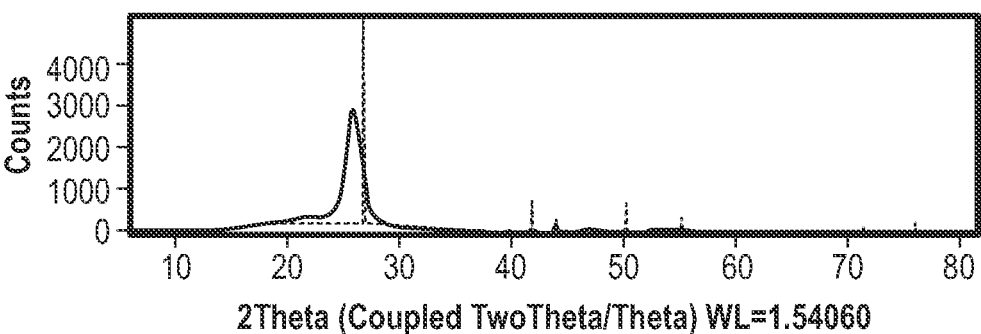
FIG. 2A includes a graph showing an X-ray spectrum of a composite body comprising in-plane oriented hBN particles according to one embodiment.

X-ray diffraction analysis was conducted to determine the degree of orientation (also called herein alignment) of the hBN particles within the composite body. In the case of in-plane aligned hBN platelets, the primary plane of interest was the in-plane direction parallel to the surface (such as the (002) plane). First, a 2D XRD spectrum was obtained after spot diffraction of the sample with a Bruker D8 diffractometer using a focused Cu Kα radiation ($\lambda$=1.5418 Å) in the step scan mode at angular positions ranging from 10° to 80°. Thereafter, a one-dimensional (1D) XRD spectrum was obtained by integration of the 2D spectrum using built-in capability of EVA software from Bruker. A Rietveld peak fitting methodology was used to compare the (002) peak intensity of the oriented hBN pattern against an un-oriented hBN database pattern to obtain a quantifiable measurement of orientation. An XRD spectrum showing the (002) peak is shown in FIG. 2A. As more (002) hBN planes align parallel to the surface the relative intensity of the (002) experimental peak increases compared to the database peak.

The peak fitting of the XRD pattern was performed using the Topas quantification software from Bruker. The Topas software has a built-in refinement functionality to determine the March-Dollase parameter using the March-Dollase function W(α), see equation (1):

$$W(\alpha) = \left( r^2 \cos^2 \alpha + \frac{1}{r} \sin^2 \alpha \right)^{-3/2}, \tag{1}$$

wherein W(α) is the fraction of crystallites oriented in the preferred direction, α is the angle between a crystallite plane (hkl) normal and the preferred orientation direction, and r is the March-Dollase parameter.

The degree of preferred orientation η (r) as a function of the March-Dollase parameter r can be calculated according to the equation (2) below:

$$\eta = 100\% \left[ \frac{(1-r)^3}{1-r} \right]^{1/2}. \tag{2}$$

Figure 2B:
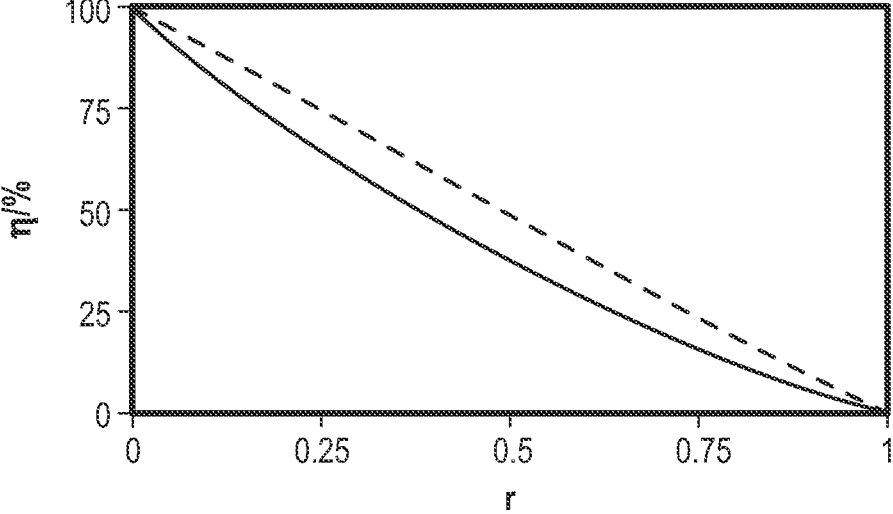
FIG. 2B includes a graph showing a relationship between r and orientation parameter $\eta$ according to the March-Dollase method.

The graph shown in FIG. 2B shows the relationship between the March-Dollase parameter r and the degree of preferred orientation η (r), which is herein also called "March-Dollase orientation parameter η." The solid line in the graph indicates the actually measured curve and the dashed line is a conversion of the curved line to a simplified linear trend line.

Measuring the Electric Volume Resistivity

The electric resistivity of the samples was determined according to ASTM D257.

Measuring of the Particle Size Distribution of hBN Particles

The particle size distribution of the hBN particles was measured by laser scattering using a Laser Scattering Particle Size Distribution Analyzer LA-950 from Horiba. The expressions median size (D50) and mean size are used according to the HORIBA manual definitions.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A composite article comprising: a composite body including an organic polymer and ceramic particles comprising hexagonal boron nitride (hBN) particles distributed throughout the organic polymer, wherein an amount of the hBN particles ranges from 40 vol % to 90 vol % based on a total volume of the composite body;

at least 90 vol % of the ceramic particles are hBN particles;

the hBN particles have an average particle size (D50) of at least 1 micron and not greater than 100 microns;

the hBN particles comprise a multi-modal particle distribution, wherein the particle size distribution of the hBN particles includes a first peak having a first peak maximum and a second peak having a second peak maximum, and an intensity ratio of the first peak maximum to the second peak maximum is at least 2:1 and not greater than 10:1, and a distance between the first peak maximum and the second peak maximum is at least 20 microns and not greater than 70 microns;

an average aspect ratio of length to thickness of the hBN particles is not greater than 200; and the composite body comprises an in plane thermal conductivity of at least 13.5 W/mK.

2. The composite article of claim 1, wherein an in-plane March-Dollase orientation parameter n of the hBN particles within the composite body is at least 50%.

3. The composite article of claim 1, wherein the in-plane thermal conductivity of the composite body is at least 16.0 W/mK.

4. The composite article of claim 1, wherein the average aspect ratio of length to thickness of the hBN particles is at least 5.

5. The composite article of claim 1, wherein the hBN particles comprise a bi-modal particle distribution.

6. The composite article of claim 1, wherein the first peak maximum corresponds to a particles size in a range of 8 microns to 13 microns, and the second peak maximum corresponds to a particle size in a range of 35 to 50 microns.

7. The composite article of claim 1, wherein a difference between the average particle size (D50) and the mean particle size of the hBN particles is at least 5 microns.

8. The composite article of claim 1, wherein an eighty percent distribution value (D90–D10) of the hBN particles is at least 15 microns and not greater than 80 microns.

9. The composite article of claim 1, wherein an electric volume resistivity of the composite body is at least 1.0E+12 Ω·cm.

10. The composite article of claim 1, wherein the organic polymer of the composite body includes a thermoplastic polymer or a thermoset polymer.

11. The composite article of claim 10, wherein the organic polymer includes a silicone polymer, an acrylate polymer, a polyurethane, an epoxide polymer, a polyamide, a polyimide, a liquid crystalline polymer (LCP), a fluoropolymer, a polyethylene, a polypropylene, a polystyrene, a polyester, a polycarbonate, a polybutylene terephthalate (PBT), a polyethylene terephthalate (PET), a polyamide, a liquid crystalline polymer (LCP), a polyacrylonitrile (PAN), a polyether ether ketone (PEEK), a polyetherketoneketone (PEKK), a polysulfone, a polyethersulfone, a polyphenylene oxide (PPO), a polyetherimide, a thermoplastic elastomer (TPE), a polyvinylidene fluoride (PVDF), a perfluoroalkoxy alkane (PFA), a fluorinated ethylene propylene (FEP), an ethylene tetrafluoroethylene (ETFE), or any copolymer thereof, or any combination thereof.

12. The composite article of claim 11, wherein the organic polymer includes a silicone polymer.

13. The composite article of claim 1, wherein the ceramic particles of the composite body consist essentially of hBN particles.

14. The composite article of claim 1, wherein the composite body further comprises a surfactant.

15. The composite article of claim 1, wherein the composite body is a sheet having a thickness of at least 25 microns and not greater than 5000 microns.

16. The composite article of claim 1, wherein the composite body comprises an in plane thermal conductivity of at least 13.5 W/mK and not greater than 40 W/mK.

17. The composite article of claim 1, wherein the hBN particles have an average particle size (D50) of at least 5 microns and not greater than 100 microns.

18. The composite article of claim 1, wherein the first peak maximum of the first peak is at a lower hBN particle size than the second peak maximum of the second peak.

19. The composite body of claim 1, wherein the intensity ratio of the first peak maximum to the second peak maximum is at least 2:1 and not greater than 5:1.

20. A method of forming a composite article, comprising:

preparing a mixture of ceramic particles and an organic polymer, wherein the ceramic particles comprise at least 90 vol % hBN particles based on the total volume of the ceramic particles, an amount of the hBN particles ranges from 40 vol % to 90 vol % based on a total volume of the mixture, the hBN particles have an average particle size (D50) of at least 1 micron and not greater than 100 microns, the hBN particles comprise a multi-modal particle distribution, wherein the particle size distribution of the hBN particles includes a first peak having a first peak maximum and a second peak having a second peak maximum, and an intensity ratio of the first peak maximum to the second peak maximum at least 2:1 and not greater than 10:1, and a distance between the first peak maximum and the second peak maximum is at least 20 microns and not greater than 70 microns, and an average aspect ratio of length to thickness of the hBN particles is not greater than 200;

applying a layer of the mixture to a mold or a support;

conducting an alignment procedure of the hBN particles; and solidifying and/or curing the organic polymer to form a composite body, wherein an in-plane thermal conductivity of the composite body is at least 13.5 W/mK.

21. The method of claim 20, wherein the first peak maximum of the first peak is at a lower hBN particle size than the second peak maximum of the second peak.

22. The method of claim 20, wherein the composite body comprises an in plane thermal conductivity of at least 13.5 W/mK and not greater than 40 W/mK.

\* \* \* \* \*